United States Patent
Tanaka et al.

(10) Patent No.: US 9,137,446 B2
(45) Date of Patent: Sep. 15, 2015

(54) IMAGING DEVICE, METHOD OF CAPTURING IMAGE, AND PROGRAM PRODUCT FOR CAPTURING IMAGE

(71) Applicant: OLYMPUS CORPORATION, Tokyo (JP)

(72) Inventors: Yoshinobu Tanaka, Tokyo (JP); Akira Ueno, Tokyo (JP); Takashi Yanada, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 137 days.

(21) Appl. No.: 14/071,135

(22) Filed: Nov. 4, 2013

(65) Prior Publication Data

US 2014/0125841 A1 May 8, 2014

(30) Foreign Application Priority Data

Nov. 8, 2012 (JP) ................................. 2012-246106

(51) Int. Cl.
- *H04N 5/232* (2006.01)
- *H04N 5/77* (2006.01)
- *H04N 5/907* (2006.01)
- *H04N 9/804* (2006.01)

(52) U.S. Cl.
CPC ........... *H04N 5/23293* (2013.01); *H04N 5/772* (2013.01); *H04N 5/907* (2013.01); *H04N 9/8042* (2013.01)

(58) Field of Classification Search
None
See application file for complete search history.

(56) References Cited

U.S. PATENT DOCUMENTS

| | | | |
|---|---|---|---|
| 7,411,623 B2 * | 8/2008 | Shibutani | 348/333.02 |
| 7,417,668 B2 * | 8/2008 | Sasagawa | 348/220.1 |
| 8,917,343 B2 * | 12/2014 | You | 348/333.05 |
| 8,947,558 B2 * | 2/2015 | You et al. | 348/231.2 |
| 2002/0140826 A1 * | 10/2002 | Sato et al. | 348/222.1 |
| 2002/0172505 A1 * | 11/2002 | Takahashi et al. | 386/120 |
| 2002/0197067 A1 * | 12/2002 | Ohnishi | 386/120 |
| 2003/0227551 A1 * | 12/2003 | Kudo | 348/207.99 |
| 2004/0174444 A1 * | 9/2004 | Ishii | 348/240.1 |
| 2004/0189824 A1 * | 9/2004 | Shibutani | 348/231.2 |
| 2004/0202456 A1 * | 10/2004 | Sasagawa | 386/120 |
| 2004/0218059 A1 * | 11/2004 | Obrador et al. | 348/220.1 |
| 2005/0069297 A1 * | 3/2005 | Kobayashi et al. | 386/120 |
| 2006/0216001 A1 * | 9/2006 | Shin | 386/107 |
| 2006/0264733 A1 * | 11/2006 | Masaki | 600/407 |
| 2008/0024645 A1 * | 1/2008 | Mizumori | 348/333.11 |
| 2009/0115861 A1 * | 5/2009 | Mochizuki | 348/220.1 |
| 2009/0237519 A1 * | 9/2009 | Fujii | 348/220.1 |
| 2009/0244306 A1 * | 10/2009 | Saito | 348/220.1 |
| 2010/0020210 A1 * | 1/2010 | Tsunekawa et al. | 348/294 |
| 2010/0158474 A1 * | 6/2010 | Tsuda | 386/68 |
| 2010/0231735 A1 * | 9/2010 | Burian et al. | 348/220.1 |
| 2011/0050931 A1 * | 3/2011 | Fujiyama et al. | 348/220.1 |
| 2011/0050942 A1 * | 3/2011 | Migiyama et al. | 348/222.1 |
| 2011/0063463 A1 * | 3/2011 | Ejima et al. | 348/220.1 |

(Continued)

FOREIGN PATENT DOCUMENTS

JP 3501505 B2 3/2004

*Primary Examiner* — Michael Osinski
(74) *Attorney, Agent, or Firm* — Westerman, Hattori, Daniels & Adrian, LLP

(57) ABSTRACT

An imaging device, a method of capturing an image, and a program product used to capture a plurality of images, reduce the captured images, transfer second image data correspondent to each of the reduced images, display first images and identify a second image correspondent to the first image, which is instructed by a user.

10 Claims, 9 Drawing Sheets

(56) References Cited

U.S. PATENT DOCUMENTS

| | | | |
|---|---|---|---|
| 2011/0102616 A1* | 5/2011 | Migiyama et al. | 348/222.1 |
| 2011/0293244 A1* | 12/2011 | Kuriyama | 386/248 |
| 2011/0310274 A1* | 12/2011 | Kuriyama | 348/231.99 |
| 2012/0026381 A1* | 2/2012 | Lee et al. | 348/333.12 |
| 2012/0176503 A1* | 7/2012 | You | 348/220.1 |
| 2013/0051771 A1* | 2/2013 | Yamada et al. | 386/278 |
| 2013/0182166 A1* | 7/2013 | Shimokawa et al. | 348/333.01 |
| 2013/0222671 A1* | 8/2013 | Tseng et al. | 348/333.11 |
| 2014/0092260 A1* | 4/2014 | Escobedo | 348/207.1 |

* cited by examiner

IMAGING DEVICE, METHOD OF CAPTURING IMAGE, AND PROGRAM PRODUCT FOR CAPTURING IMAGE

BACKGROUND OF THE INVENTION

1. Field of the Invention

The present invention relates to an imaging device, a method of capturing an image, and a program product for capturing an image.

Priority is claimed on Japanese Patent Application No. 2012-246106, filed Nov. 8, 2012, the content of which is incorporated herein by reference.

2. Description of the Related Art

All patents, patent applications, patent publications, scientific articles, and the like, which will hereinafter be cited or identified in the present application, will hereby be incorporated by reference in their entirety in order to describe more fully the state of the art to which the present invention pertains.

In a digital camera, when a fast moving subject (e.g., a moving car) or a subject moving unpredictably such as an animal or a child is photographed, an opportunity for a photograph may often be missed. When such a subject is photographed, a user may use a continuous shooting photography mode of the digital camera. Specifically, a subject is photographed continuously at short intervals using the continuous shooting photography mode to capture several images to tens of images. After photographing the subject, the user causes images obtained through photography to be displayed one by one on a display of the digital camera, and selects a photograph. Accordingly, the user can discard unnecessary photographs and leave only desired photographs in a storage medium.

Further, many digital cameras have a moving image photography function. For example, an image forming device including a recording means that records, on one storage medium, a plurality of images corresponding to a moving image signal for a plurality of screens stored in a memory means, a selection means that selects a desired image from among the plurality of images recorded on the storage medium, and a control means that reads the image signal of the screen corresponding to the image selected by the selection means from the memory means and controls the recording means to record the image corresponding to the read image signal is disclosed in Japanese Patent No. 3501505.

SUMMARY OF THE INVENTION

According to a first aspect of the present invention, an imaging device includes: an imaging unit that images a subject; a transfer processing unit that reduces images of a plurality of frames obtained through imaging by the imaging unit and transfers second image data of a frame associated with each of the images of a plurality of frames, which are images obtained through imaging by the imaging unit; a storage processing unit that causes first image data of a plurality of frames obtained through reduction by the transfer processing unit to be stored in a storage medium and causes the second image data transferred by the transfer processing unit to be stored in the storage medium; a processing unit, that causes the images of a plurality of frames to be displayed on a display unit with reference to the first image data stored by the storage processing unit; and an input unit that receives an instruction of an image of any one frame from among the images displayed on the display unit, wherein the processing unit may identify the second image data corresponding to the image of the instructed frame.

According to a second aspect of the present invention, the imaging device of the first aspect may include an image processing unit that performs image processing on the second image data identified by the processing unit, and the storage processing unit may store the image data in the storage medium, wherein the image data are processed by the image processing unit.

According to a third aspect of the present invention, the imaging device of the second aspect may include an input unit that receives a deletion instruction. When the input unit receives the deletion instruction, the storage processing unit may delete at least one of the first image data of a plurality of frames and the second image data of a plurality of frames from the storage medium in which the respective image data has been stored.

According to a fourth aspect of the present invention, in the imaging device of any one of the first to third aspects, the processing unit may perform slow playback or frame-by-frame playback on the image when the image is played back.

According to a fifth aspect of the present invention, the imaging device of any one of the first to fourth aspects may include a second input unit that receives a still image photography instruction from a photographer the imaging unit may image the subject when the second input unit receives the photography instruction, and the storage processing unit may cause still image data obtained through imaging by the imaging unit to be stored in the recording medium.

According to a sixth aspect of the present invention, in the imaging device of the fifth aspect, the still image data may be raw image data.

According to a seventh aspect of the present invention, in the imaging device of any one of the first to sixth aspects, the transfer processing unit may include: a first transfer unit that reduces the images of a plurality of frames obtained through imaging by the imaging unit; and a second transfer unit that transfers the second image data of a plurality of frames associated with each of the images of a plurality of frames, which is an image obtained through imaging by the imaging unit.

According to an eighth aspect of the present invention, in the imaging device of any one of the first to sixth aspects, the transfer processing unit may reduce an image of one of an odd frame and an even frame obtained through imaging by the imaging unit, and transfer an image of the other of the odd frame and the even frame obtained through imaging by the imaging unit.

Further, according to a ninth aspect of the present invention, a method of capturing an image may include: a transfer processing step of reducing images of a plurality of frames obtained through imaging, and transferring second image data of a frame associated with each of the images of a plurality of frames; a storage processing step of causing first image data of a plurality of frames obtained through the reduction in the transfer processing step to be stored and causing the second image data of a plurality of frames transferred in the transfer processing step to be stored; a processing step of causing the images of a plurality of frames to be displayed with reference to the first image data stored in the storage processing step; an input step of receiving an instruction of an image of any one frame from among the displayed images; and an identifying step of identifying the second image data corresponding to the image of the instructed frame.

According to a tenth aspect of the present invention, a program product for capturing an image, the program product may comprise a program capable of executing: a transfer processing step of reducing images of a plurality of frames obtained through imaging and transferring second image data of a frame associated with each of the images of a plurality of frames; a storage processing step of causing first image data of a plurality of frames obtained through the reduction in the transfer processing step to be stored and causing the second image data of a plurality of frames transferred in the transfer processing step to be stored; a processing step of causing the images of a plurality of frames to be displayed with reference to the first image data stored in the storage processing step; an input step of receiving an instruction of an image of any one frame from among the displayed images; and an identifying step of identifying the second image data corresponding to the image of the instructed frame.

BRIEF DESCRIPTION OF THE DRAWINGS

The above features and advantages of the present invention will be more apparent from the following description of certain preferred embodiments taken in conjunction with the accompanying drawings, in which.

DETAILED DESCRIPTION OF THE INVENTION

The present invention will be now described herein with reference to illustrative preferred embodiments. Those skilled in the art will recognize that many alternative preferred embodiments can be accomplished using the teaching of the present invention and that the present invention is not limited to the preferred embodiments illustrated for explanatory purpose.

In the present application, a processing speed of an image sensor of an imaging device is about 500 MPixels/sec. A processing speed of an image processing unit of the imaging device is about 200 MPixels/sec. A recording speed of a storage medium (e.g., an SD card) mounted on the imaging device is about 100 MBytes/sec. This means that the storage medium can record data for 100 MPixels in one second when the gradation of one pixel is 256.

Conventionally, a storage medium with a low recording speed manages recording of plenty of images, which were compressed to reduce their content (e.g., JPEG images), so that the images might be stored successively.

The imaging device in the present embodiment records image data in the storage medium without performing image processing such as compression, and performs image processing on an image selected by a user after the recording. Accordingly, when the above-described bottleneck is changed from the recording speed of the storage medium to the processing speed of the image processing unit, the data can be stored without performing image processing, thus improving the continuous shooting speed for a still image.

First Embodiment

Figure 1:
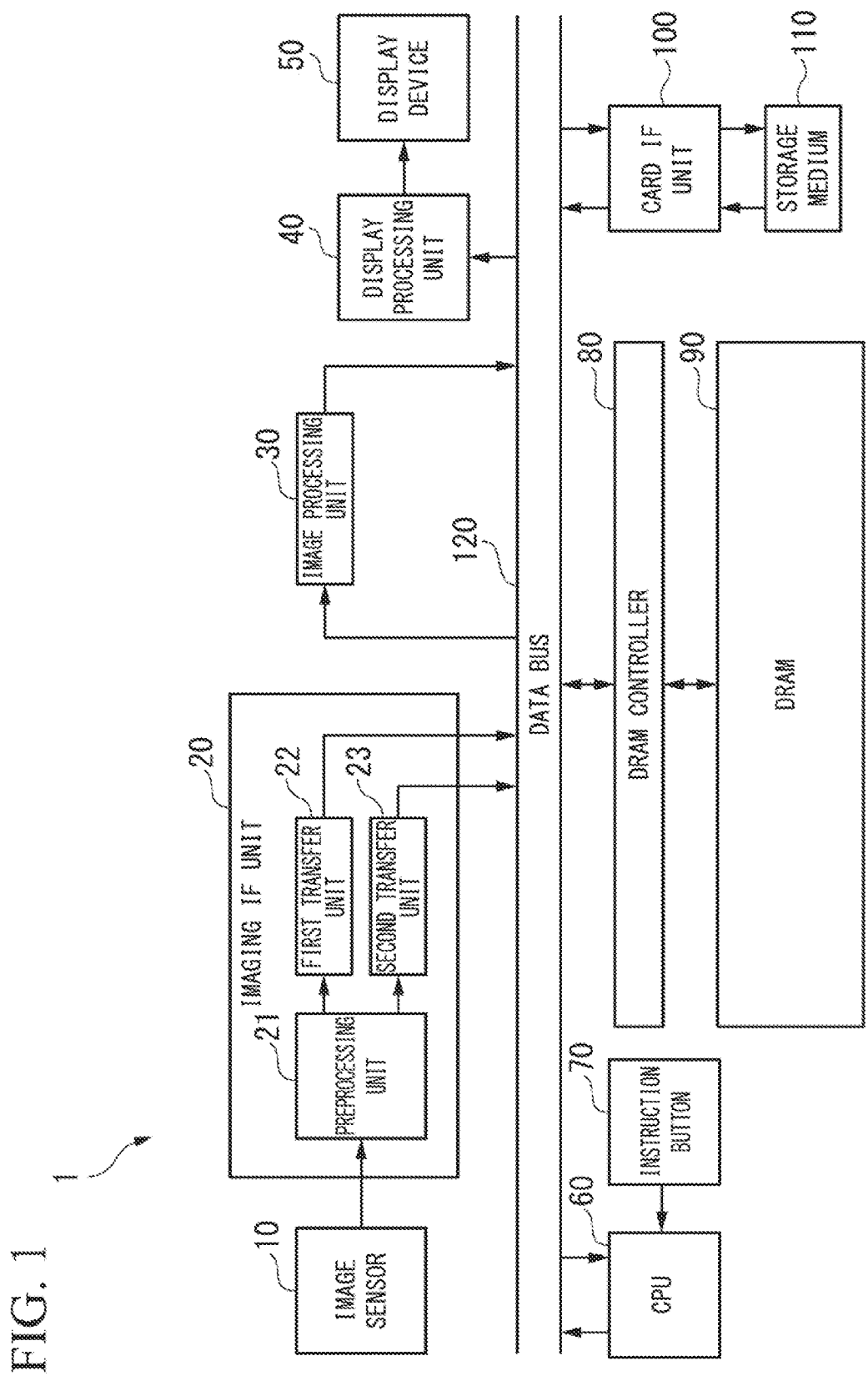
FIG. 1 is a schematic block diagram illustrating a configuration of an imaging device in a first embodiment.

Hereinafter, an embodiment of the present invention will be described in detail with reference to the drawings. FIG. 1 is a schematic block diagram illustrating a configuration of an imaging device 1 in the present embodiment. The imaging device 1 includes an image sensor (an imaging unit) 10, an imaging IF (Interface) unit (a transfer processing unit) 20, an image processing unit 30, a display processing unit 40, a display device (a display unit) 50, a CPU 60, an instruction button 70, a DRAM controller 80, a DRAM 90, a card IF (Interface) unit 100, a storage medium 110, and a data bus 120.

First, an overview of a process of the imaging device 1 will be described. The imaging device 1 performs still image photography at a high speed, stores a still image in the storage medium 110, and stores a reduced image of the still image as a moving image in the storage medium 110. When a user indicates a desired frame while the imaging device 1 is playing back the stored moving image after photography completion, the imaging device 1, for example, selects a still image corresponding to the indicated frame. Also, the imaging device 1, for example, records the selected still image in the storage medium 110 as one image file. Further, the imaging device 1 deletes unnecessary images, that are not selected in a batch in response to an instruction of the user. Accordingly, it is possible to improve the image quality of the still image photographed at a timing desired by a user while securing operability.

Next, an overview of a process of each unit of the imaging device 1 will be described.

The image sensor 10 images a subject and outputs an image signal obtained by imaging to the imaging IF unit 20. The image sensor 10 is, for example, a CCD or CMOS image sensor, in the image sensor 10, for example, a drive mode may be changed by register setting.

The imaging IF unit 20 acquires the image signal from the image sensor 10, performs, for example, preprocessing and a resizing process, and transfers the resized data to the DRAM 90. Here, the imaging IF unit 20 includes a preprocessing unit 21, a first transfer unit 22, and a second transfer unit 23.

The preprocessing unit 21, for example, performs preprocessing such as defect correction, shading correction and pixel defect correction on the image captured by the image sensor 10. The preprocessing unit 21 outputs the preprocessed data to the first transfer unit 22 and the second transfer unit 23.

The first transfer unit 22 performs a resizing process (e.g., a reducing process) on the data after the preprocessing input from the preprocessing unit 21, and transfers an image after the resizing, process to the DRAM 90. Thus, the first transfer unit 22, for example, reduces the image obtained through imaging of the image sensor 10 at the time of photography (e.g., an image after the preprocessing) to a first image for a plurality of frames.

The second transfer unit 23 transfers the data after the preprocessing input from the preprocessing unit 21 to the DRAM 90. Thus, the second transfer unit 23, for example, transfers data of a second image (hereinafter referred to as second image data) for a plurality of frames that is the same as the image that is a reduction target of the first transfer unit 22, which is the image obtained through imaging of the image sensor 10 at the time of photography (e.g., an image after the preprocessing). Here, in the present embodiment, for example, the first image and the second image are the same image.

The image processing unit 30 performs, for example, image processing such as noise removal, a YC conversion process, a resizing process, a JPEG compression process or an H.264 compression process on the data after the preprocessing acquired from the DRAM 90 to generate a display image or a recording image at the time of recording. Also, the image processing unit 30, for example, transfers the generated display image or recording image to the DRAM 90. Further, at the time of playback, the image processing unit 30, for example, performs processing such as JPEG decompression or H.264 decompression on the image data acquired from the DRAM 90, and transfers the processed data to the DRAM 90.

The display processing unit 40 acquires the display image data from the DRAM 90 and performs, for example, a displaying process such as a well-known OSD (On Screen Display) superimposing process. Also, the display processing unit 40 transfers the image signal after the displaying process to the display device 50.

The display device 50 displays the image indicated by the image signal supplied from the display processing unit 40. The display device 50 is, for example, a display such as a TFT (Thin Film Transistor) display or an EVF (Electronic View Finder). Further, the display device 50 may be an external display, such as a TV.

The CPU 60 performs control of the entire imaging device 1.

The instruction button 70 is a button that receives an instruction of the user, such as a photography instruction. The instruction button 70 functions as an input unit that receives a deletion instruction from a photographer. Further, the instruction button 70 may be a touch panel or the like.

The DRAM controller 80 receives a transfer request from a plurality of blocks connected to the data bus 120 and performs write/read access of the DRAM 90.

The DRAM 90 temporarily holds the first image data transferred from the first transfer unit 22 and the second image data transferred from the second transfer unit 23.

The card IF unit 100 acquires the first image data and the second image data from the DRAM 90, and transfers the acquired first image data and second image data to the storage medium 110. Further, the card IF unit 100 acquires the second image data from the storage medium 110, and transfers the second acquired image data to the DRAM 90.

In the storage medium 110, the first image data and the second image data are recorded by the CPU 60 via the card IF unit 100. Here, the storage medium 110 is, for example, a storage medium such as an SD card or a CF. In the present embodiment, the CPU 60, for example, associates the first image data (moving image) and the second image data (still image) using a frame number stored in a header of image data of each frame of the first image data (moving image) and a number stored in a header of the second image data (still image). Further, a rule indicating an association between the image of each frame of the first image data (moving image) and the image of the second image data (still image) may be stored, for example, in the storage medium 110 by the CPU 60.

The data bus 120 is a bus for transferring data from one unit to the other unit.

Figure 2:
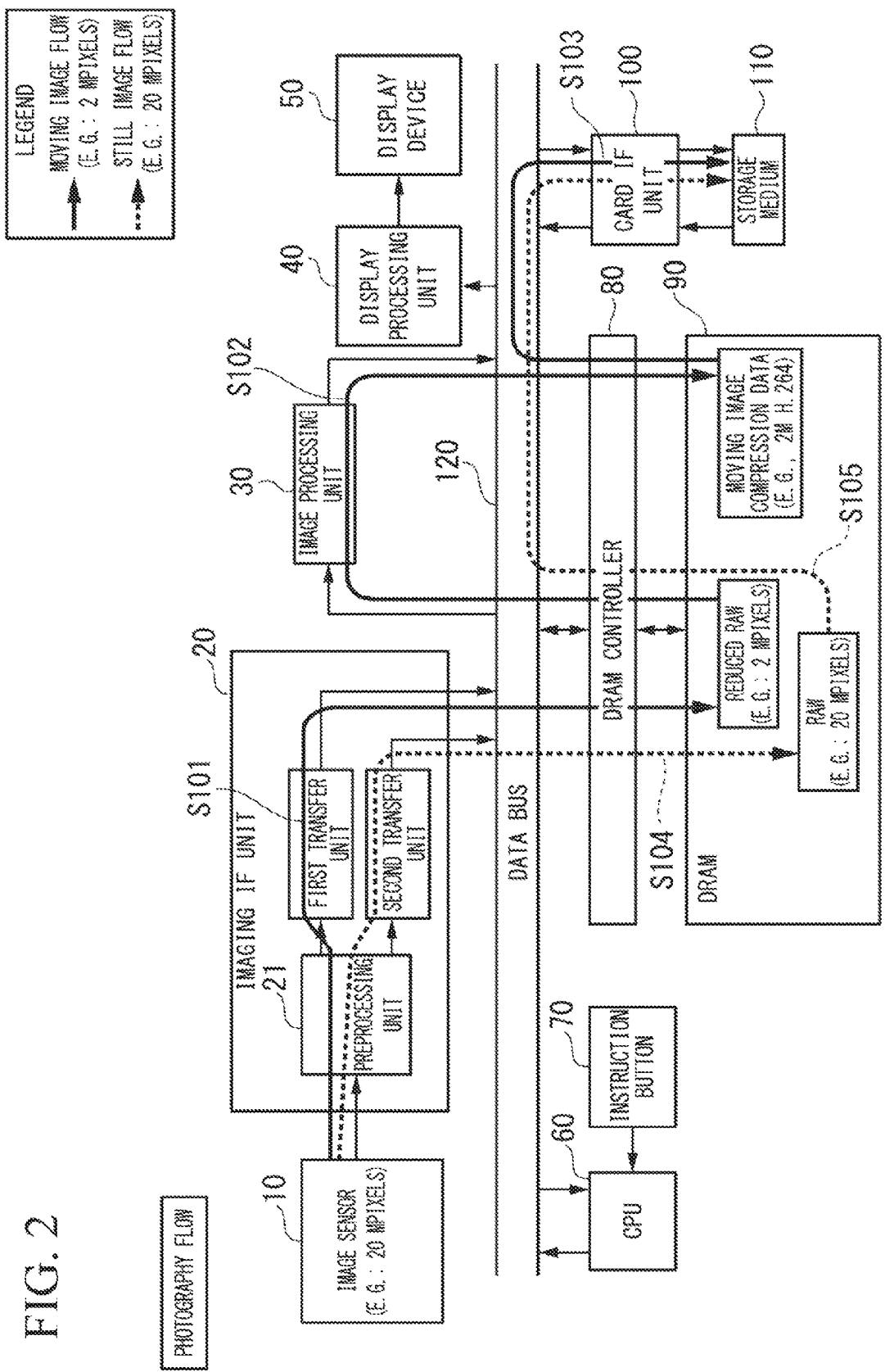
FIG. 2 is a diagram illustrating an example of a flow of a process at the time of photography of the imaging device of the first embodiment.

Next, a process of the imaging device 1 at the time of imaging, moving image playback, and still image extraction will be described. FIG. 2 is a diagram illustrating an example of a flow of a process at the time of photography of the imaging device 1 in the present embodiment. Here, for example, the number of pixels of the image sensor 10 is assumed to be 20 Mpixels. The preprocessing unit 21, for example, causes the same data to branch in two. The imaging device 1 processes one branch of the data as a moving image and processes the other branch of the data as a still image. The imaging device 1 performs processing of the moving image and processing of the still image in parallel. The imaging device 1 performs the following processing for a moving image.

(Step S101) First, the first transfer unit performs a reduction process on the image acquired from the image sensor 10 via the preprocessing unit 21, and stores data of a reduced raw image (hereinafter referred to as reduced raw data) obtained by performing the reduction process in the DRAM 90. The reduced raw data is, for example, data of the raw image of 2 Mpixels.

(Step S102) Next the image processing unit 30 reads the reduced raw data from the DRAM 90, and performs a series of image processing (e.g., a YC conversion process, a resizing process, and a compression process) on the read reduced raw data. Also, the image processing unit 30 transfers the moving image compression data (e.g., moving image data of an H.264 format of 2 Mpixels), which was obtained by performing the image processing, to the DRAM 90.

(Step S103) Next, the CPU 60 stores the moving image compression data, which has been stored in the DRAM 90, in the storage medium (e.g., an SD card) via the card IF unit 100.

Next, a flow of processing of the still image will be described.

(Step S104) First, the second transfer unit 23 stores, in the DRAM 90, raw image data (e.g., still image data of 20 Mpixels) acquired from the image sensor 10 via the preprocessing unit 21, in parallel with the first transfer unit 22.

(Step S105) Next, the CPU 60 stores the raw image data, which has been stored in the DRAM 90, in the storage medium (e.g., an SD card) via the card IF unit 100.

Figure 3:
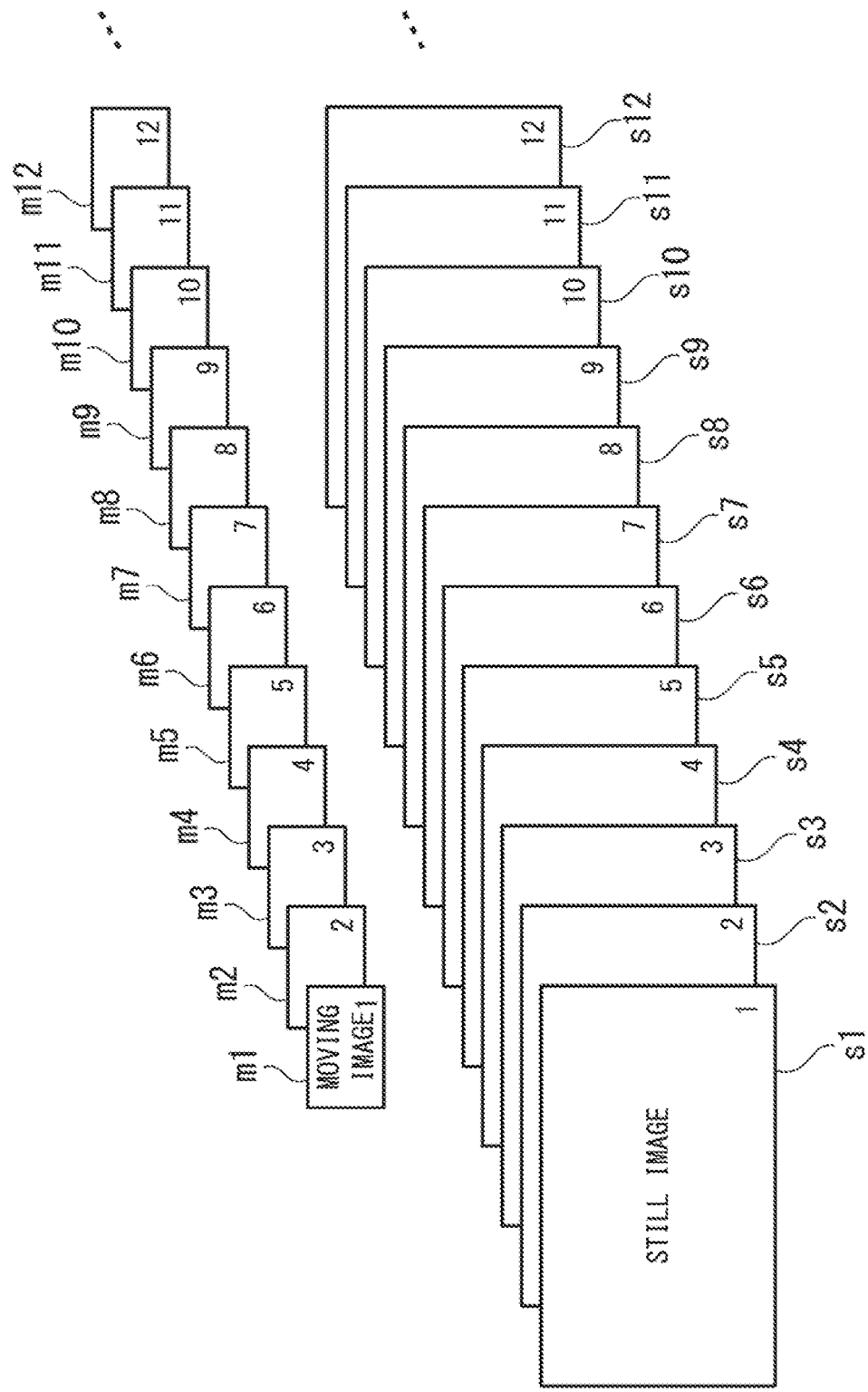
FIG. 3 illustrates an example of still images and a moving image corresponding to the still images stored in a storage medium.

Through the processing described above, the still images and the moving image corresponding to the still images, which are shown in an example of FIG. 3, are recorded in the storage medium 110. FIG. 3 illustrates an example of the still images and the moving image corresponding to the still images stored in the storage medium 110. In FIG. 3, images m1 to m12 of respective frames constituting the moving image and still images s1 to s12 are shown. The image mi (i is an integer ranging from 1 to 12) of each frame constituting the moving image corresponds to the still image si having the same index i. The image mi of each frame constituting the moving image has a smaller recording size than the corresponding still image si.

Figure 4:
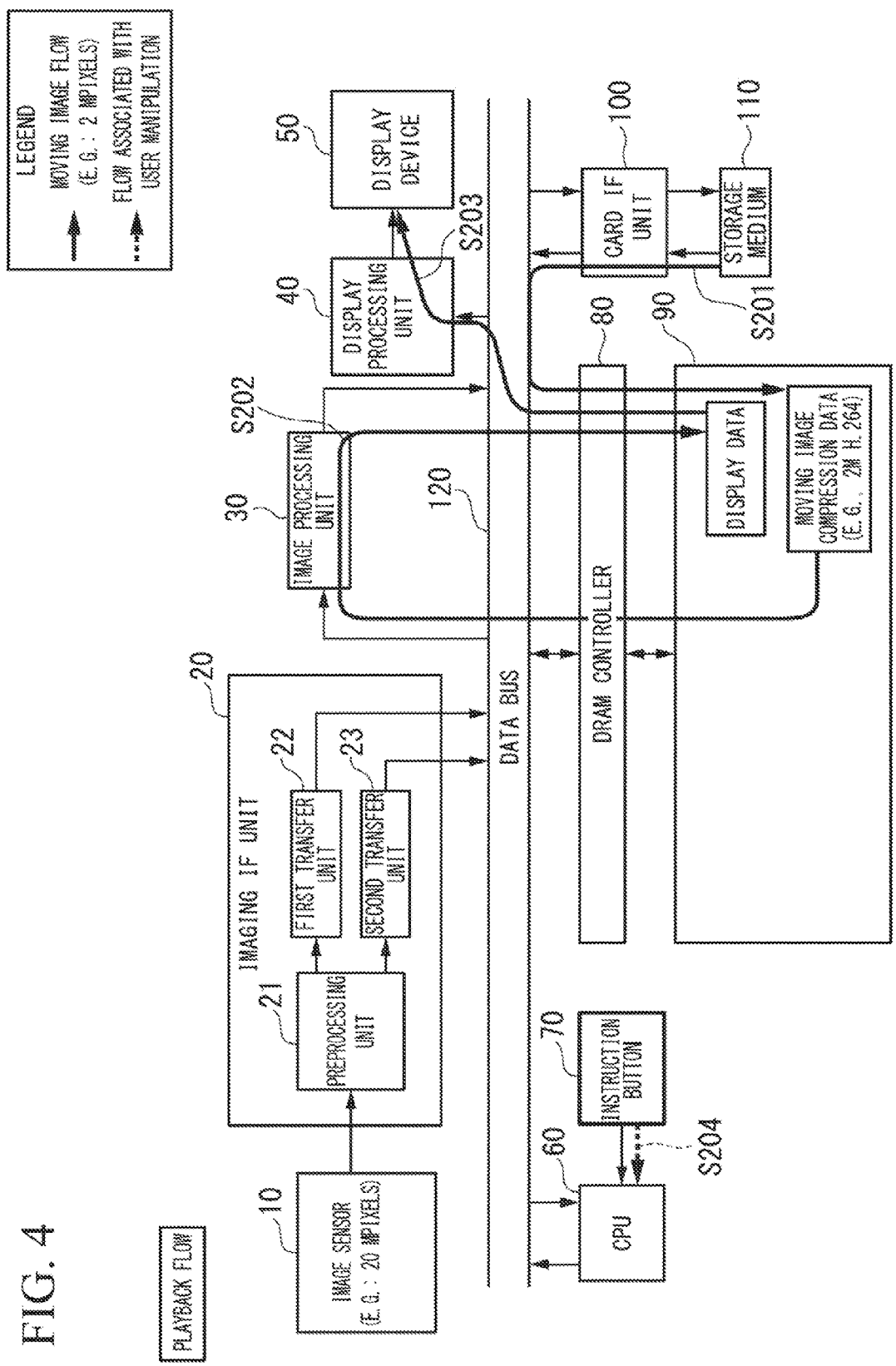
FIG. 4 is a diagram illustrating an example of a flow of a process at the time of moving image playback of the imaging device of the first embodiment.

FIG. 4 is a diagram illustrating an example of a flow of processing at the time of moving image playback of the imaging device 1 in the present embodiment.

(Step S201) First, the CPU 60 reads the moving image compression data from the storage medium 110, and stores the read moving image compression data in the DRAM 90.

(Step S202) Next, the image processing unit 30 reads the moving image compression data stored in the DRAM 90, decompresses the read moving image compression data, and stores the moving image compression data after the decompression as display data in the DRAM 90.

(Step S203) Next, the display processing unit 40 reads the display data from the DRAM 90, and causes the read display data to be displayed on the display device 50. Accordingly, the moving image indicated by the display data is displayed on the display device.

(Step S204) A user presses the instruction button (e.g., a release button) 70 at any timing (e.g., a desired timing) while viewing the moving image. If the instruction button 70 is pressed, the instruction button 70 outputs a signal, which indicates that the instruction button has been pressed, to the CPU 60. When the CPU 60 receives the signal from the instruction button 70, the CPU starts a still image extraction process shown in FIG. 5.

Figure 5:
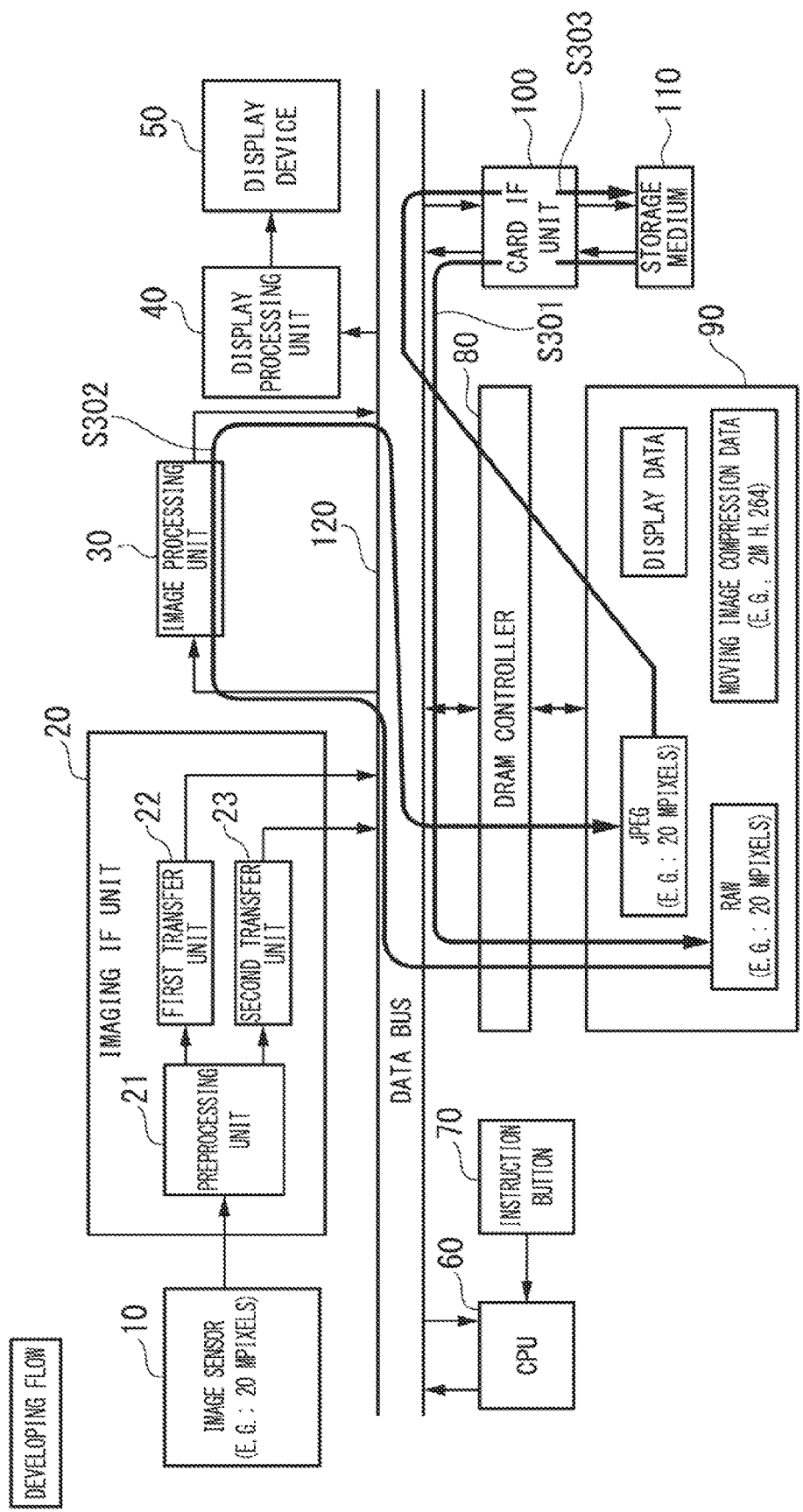
FIG. 5 is a diagram illustrating an example of a flow of a process at the time of still image extraction of the imaging, device of the first embodiment.

FIG. 5 is a diagram illustrating an example of a flow of a process at the time of still image extraction of the imaging device 1 in the present embodiment.

(Step S301) First, the CPU 60 extracts a still image corresponding to an image of a frame displayed at a timing at which the user presses the instruction button 70. Also, the CPU 60 reads raw image data indicating the selected still image, and stores the read raw image data in the DRAM 90.

(Step S302) Next, the image processing unit 30, for example, reads the raw data from the DRAM 90, and performs a developing process on the raw data. In the developing process, for example, YC conversion, noise removal distortion correction, and JPEG compression processes are sequentially performed. The image processing unit 30 stores the image data after the developing process (e.g., JPEG image data herein) in the DRAM 90.

(Step S303) Next, the CPU 60 reads the JPEG image data from the DRAM 90, and records the read JPEG image data in the storage medium 110 via the card IF unit 100. Thus, the still image corresponding to the moving image when the user presses the instruction button 70 is read from the storage medium 110, the developing process is performed, and a resultant still image is stored in the storage medium 110.

After the still image extraction process is completed, the CPU 60 erases all images other than the extracted image in a batch when the user designates batch erasure using the instruction button 70.

Figure 6:
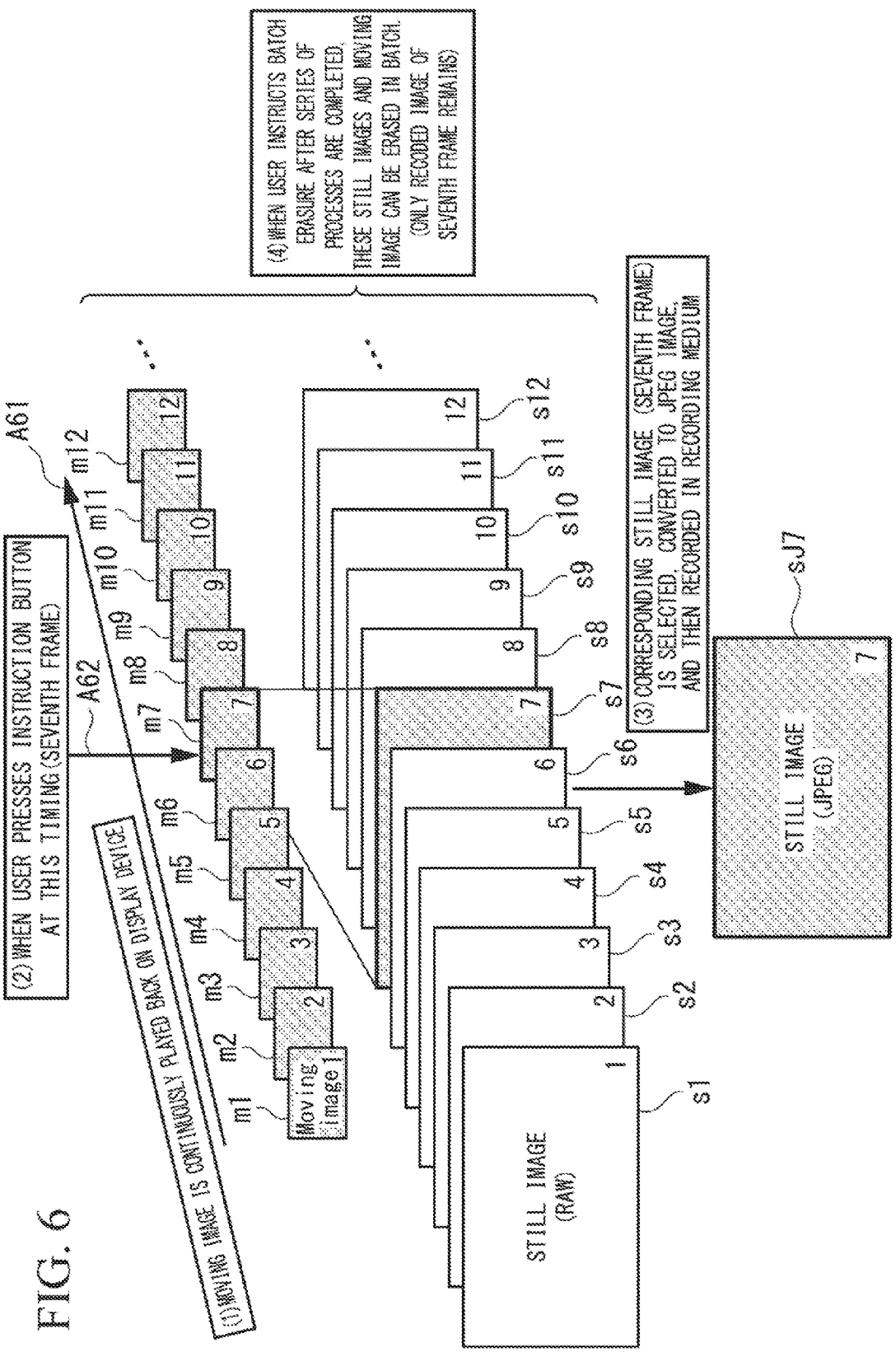
FIG. 6 is a diagram illustrating an example of a relationship between a moving image and still images stored at the time of photography and a still image newly stored in a recording medium in response to manipulation of a user.

Next, a specific example of the above-described process will be described with reference to FIG. 6. FIG. 6 is a diagram illustrating an example of a relationship between the moving image and the still images stored at the time of photography and the still image newly stored in the storage medium 110 in response to a manipulation of the user. In FIG. 6, images m1 to m12, . . . of respective frames constituting the moving image played back continuously in a direction indicated by an arrow A61 on the display device 50, which have been stored at the time of photography, are shown. Further, still images (raw images) s1, . . . , s12, . . . are shown.

When the user presses the instruction button 70 at a timing (a seventh frame) of an arrow A62 while the images m1 to m12, . . . are being played back continuously on the display device 50, the CPU 60 selects the still image s7 of a seventh frame corresponding to the image in of the seventh frame. Also, in the example of the FIG. 6, the image processing unit 30 converts the selected still image s7 to a JPEG image sJ7. Also, the CPU 60 stores the JPEG image sJ7 after the conversion in the storage medium 110.

After the series of processes is completed, when the user instincts batch erasure using the instruction button 70, the CPU 60 erases images other than the JPEG image sJ7 after the conversion in a batch. Accordingly, only the recoded JPEG image sJ7 of the seventh frame is left in the storage medium 110.

Further, the imaging device 1 may erase images other than the selected image without converting the selected still image (e.g., raw image) to the JPEG image. Thus, only the selected still image (e.g., raw image) is left in the storage medium 110.

To summarize the above process, in the present embodiment, the CPU 60 functions as a storage processing unit that causes the first image data for a plurality of frames obtained through the reduction by the first transfer unit 22 to be stored in the storage medium and causes the second image data for a plurality of frames transferred by the second transfer unit 23 to be stored in the storage medium at the time of photography. The display processing unit 40 functions as a processing unit that causes the first image data for a plurality of frames to be displayed on the display device 50 after the photography. Also, the instruction button 70 functions as an input unit that receives an image selected by the user of the own device from the first image data displayed by the display device 50. Also, the CPU 60 identifies the second image data corresponding to the image selected by the user.

Thus, the imaging device 1 records a moving image for playback and an image for still image recording at the time of photography. The user selects an image from the moving image while viewing the moving image at the time of playback. The imaging device 1 performs a developing process on the still image corresponding to the selected image and stores the image data after the developing process in the storage medium 110. Thus, since the user selects an image at a desired timing (frame) after capturing the moving image and stores the selected image with high image quality, the user can record the image with high image quality without missing an opportunity for a photograph.

Further, since the moving image has a reduced number of pixels, a processing load of the imaging device 1 according to displaying when the moving image is continuously displayed can be reduced. Accordingly, the time related to reading or continuously displaying the moving image can be reduced. Thus, the imaging device 1 of the present embodiment can have improved operability in comparison with conventional continuous shooting of a still image.

Further, in conventional extraction of a still image from a moving image, a selected moving image is enlarged. Accordingly, image quality is not very good. On the other hand, in the imaging device 1 of the present embodiment, since the image of the still image corresponding to the image of the frame selected from the moving image by the user is read from the storage medium 110, the image quality of the image selected by the user can be improved in comparison with the conventional extraction of a still image from a moving image.

Further, in the present embodiment, the first transfer unit 22 and the second transfer unit 23 are included in the imaging IF unit 20. The first transfer unit 22 transfers the reduced raw data and the second transfer unit 23 transfers the raw data for still images. Accordingly it is possible to smoothly perform a recording process without increasing the processing load of the imaging device 1.

Further, it is difficult for the user to designate optimal composition at the time of photography. However, since the user selects an image when composition is optimal while the moving image is being played back, the user can easily designate the optimal composition.

Further, while the example in which the still image has a raw format of 20 Mpixels and the moving image has an H.264 format of 2 Mpixels has been described in the present embodiment, the present invention is not particularly limited thereto. The still image may have a raw compression format, a JPEG format or the like. The moving image may have a format, according to another moving image compression scheme or may have a format according to a still image compression scheme.

Further, while the expression "moving image" has been used in the present embodiment for convenience, "moving image playback" may indicate being able to "to play back a moving image," and a compression scheme dedicated for a moving image may not be used as a compression scheme. For example, the imaging device 1 may compress the image of each frame constituting the moving image using a still image compression scheme. The storage medium 110 may be a removable external storage medium (e.g., an SD card) or a dedicated memory (e.g., flash memory) included inside the imaging device 1. Further, the storage medium 110 of the imaging device 1 may include an external storage medium and an internal dedicated memory in parallel. For example, the imaging device 1 may cause a moving image and still images to be stored in the internal dedicated memory at the time of photography, and the imaging device 1 may cause an image obtained by performing the developing process on the still image corresponding to the frame selected by the user to be stored in the external storage medium.

Further, the imaging device 1 in the present embodiment generates, for example, a moving image and still images for all frames, but the present invention is not limited thereto. The imaging device 1 may generate, for example, a moving image for an odd frame and a still image for an even frame.

In this case, the imaging device 1 may associate the respective frames of the moving image with the still images in one-on-one correspondence. Thus, for corresponding images between the moving image and the still images, the image data output from the image sensor 10, which is a source, may not be the same. From this, the second transfer unit 23 may transfer second image data for a plurality of frames associated with an image for a plurality of frames that are a reduction target of the first transfer unit, which is the image obtained through imaging by the image sensor 10, at the time of photography.

Figure 9:
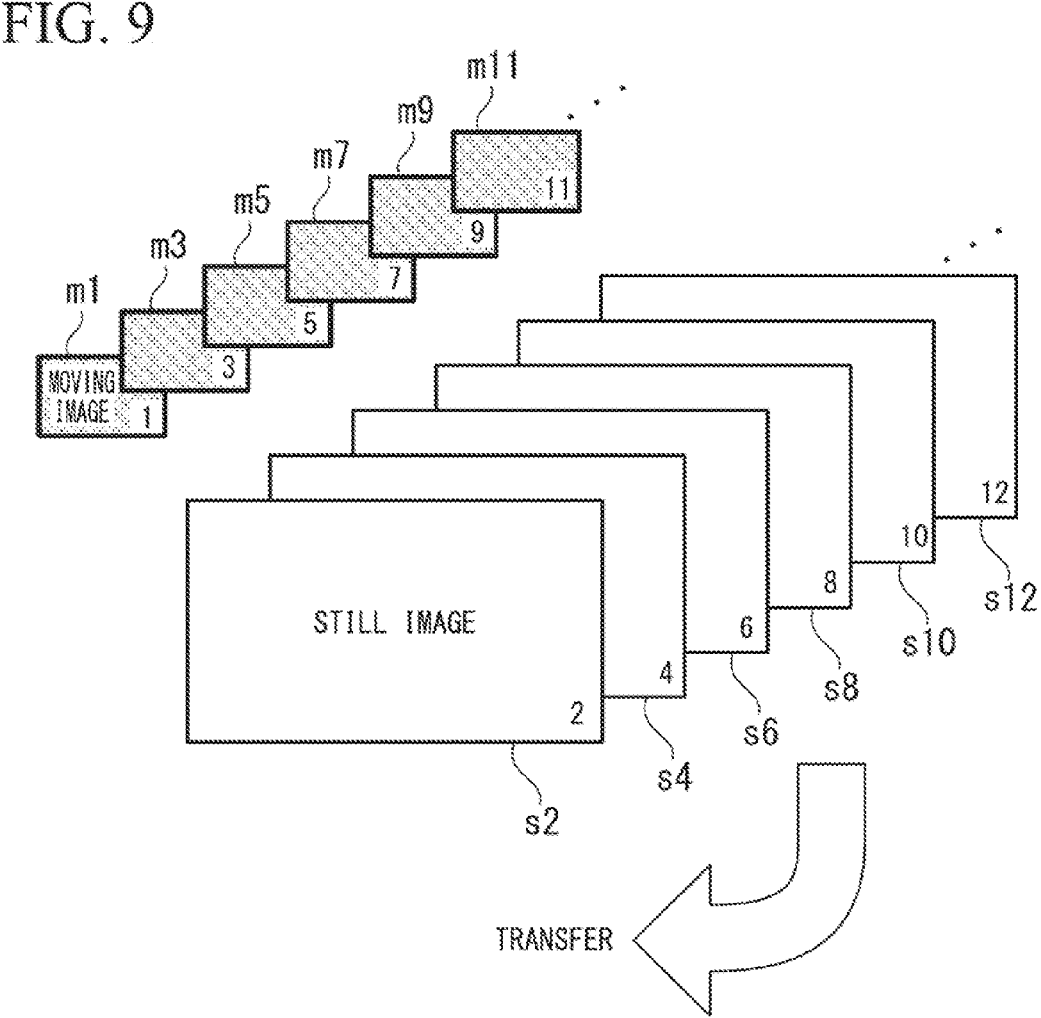
FIG. 9 is a diagram illustrating an example of a relationship between a frame of a reduced moving image and a frame of a still image to be transferred.

Further, the first transfer unit 22, for example, may process the moving image in the odd frame and may process the still image in the even frame. Specifically, for example, the first transfer unit 22 may reduce the image of the odd frame obtained through imaging by the image sensor 10, as shown in FIG. 9. Further, the first transfer unit 22 may transfer the image data of the even frame associated with each of the images of the odd frames that are reduction targets, which is the image obtained through imaging by the image sensor 10. In this case, the imaging IF unit 20 may not include the second transfer unit 23 since the second transfer unit 23 does not perform processing.

Further, in contrast with the above, the first transfer unit 22 may process a moving image in an even frame, and may process a still image in an odd frame. In other words, the first transfer unit 22 of the imaging IF unit 20 may reduce the image of the odd frame or the even frame obtained through imaging by the image sensor 10, and may transfer frames that are not the reduction targets described above which the image sensor 10 has obtained through imaging.

Further, in the present embodiment, the CPU 60 deletes both the first image data for a plurality of frames and the second image data for a plurality of frames when the instruction button 70 receives a deletion instruction from the photographer, but the present invention is not limited thereto. When the instruction button 70 serving as the input unit receives a deletion instruction from the photographer, the CPU 60 serving as the storage processing unit may delete at least one of the first image data for a plurality of frames and the second image data for a plurality of frames from the storage medium 110 in which the respective image data has been stored.

Further, while the image processing unit 30 performs image processing on the still image corresponding to the image of the frame selected by the user in the present embodiment, the present invention is not limited thereto and the still image may be directly stored in the storage medium 110 without being subjected to the image processing. In this case, the CPU 60 may delete images other than the stilt image corresponding to the image selected by the user from the storage medium 110.

Second Embodiment

Figure 7:
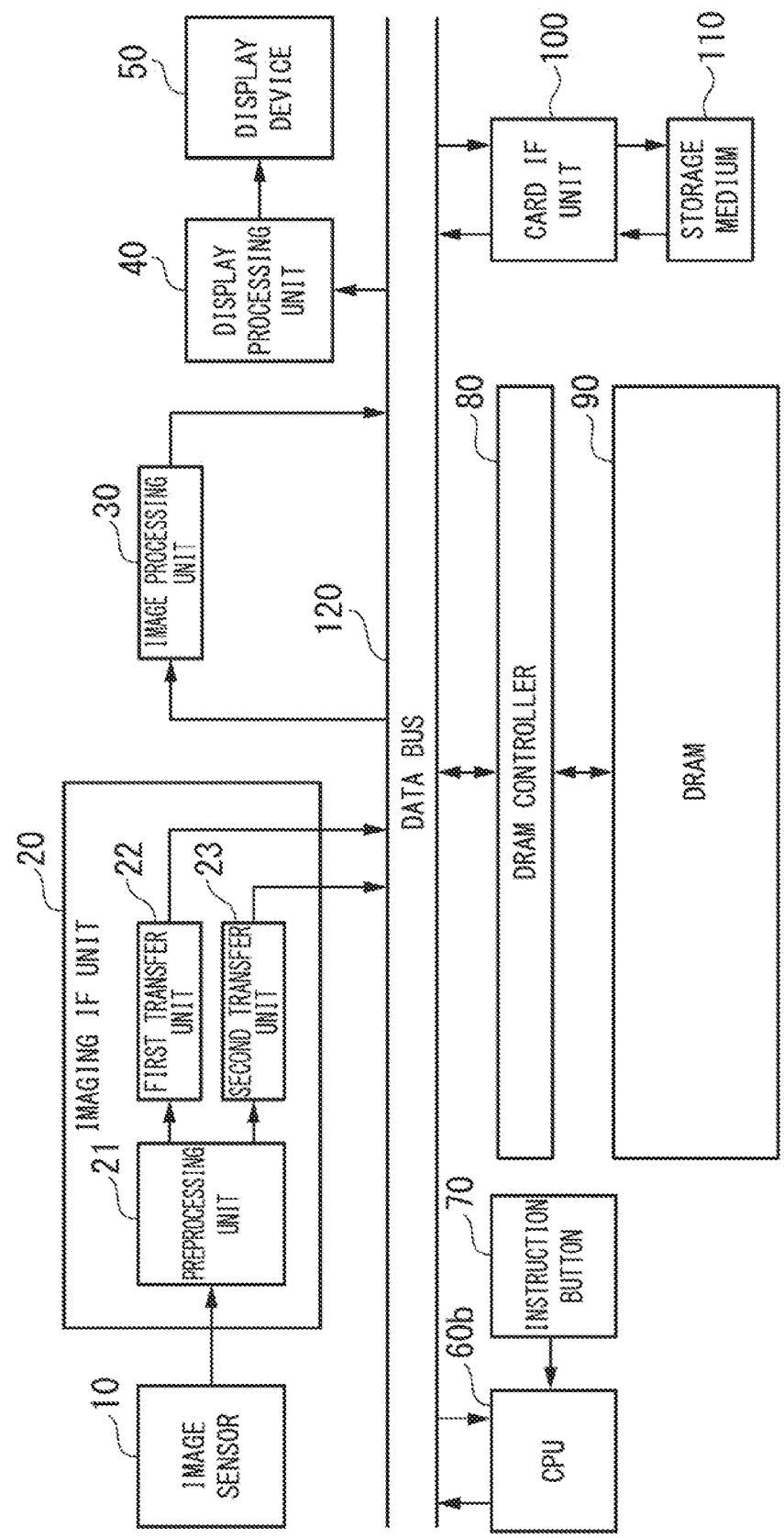
FIG. 7 is a schematic block diagram illustrating a configuration of an imaging device of a second embodiment.

Next, a second embodiment will be described. An imaging device 1b in the second embodiment differs from the imaging device 1 in the first embodiment in that a slow playback mode or a frame-by-frame playback mode is set at the time of playback. FIG. 7 is a schematic block diagram illustrating a configuration of the imaging device 1b in the second embodiment. Components common to FIG. 1 are denoted by the same reference numerals and a concrete description thereof is omitted. In the configuration of the imaging device 1b of FIG. 7, the CPU 60 in the configuration of the imaging device 1 of FIG. 1 is changed to a CPU 60b.

The CPU 60b performs processing similar to the CPU 60 in the first embodiment; but the following matters are added. When moving image compression data stored in a storage medium 110 is played back, the CPU 60b, for example, controls the display processing unit 40 to perform slow playback or frame-by-frame playback on a moving image indicated by the moving image compression data after decompression. Accordingly since the moving image is played back slowly or played back frame by frame, a user can easily select an image desired to be left in a record from among images included in the moving image, in addition to effects of the first embodiment. Accordingly, operability when the user selects an image of one frame from the moving image is improved.

Further, when the user selects an image when composition is optimal while playing back the moving image at the time of photography, the moving image is played back slowly or played back frame by frame and thus the user can easily designate optimal composition.

Third Embodiment

Next, a third embodiment will be described. The imaging device 1 in the first embodiment accumulates the moving image and the still images (raw images) at the time of photography and identifies the still image corresponding to the image of the frame selected from the moving image by the user at the time of playback. On the other hand, in an imaging device 1c of the third embodiment, the series of processes performed in the first embodiment are positioned as processes at the time of "loss prevention mode."

Figure 8:
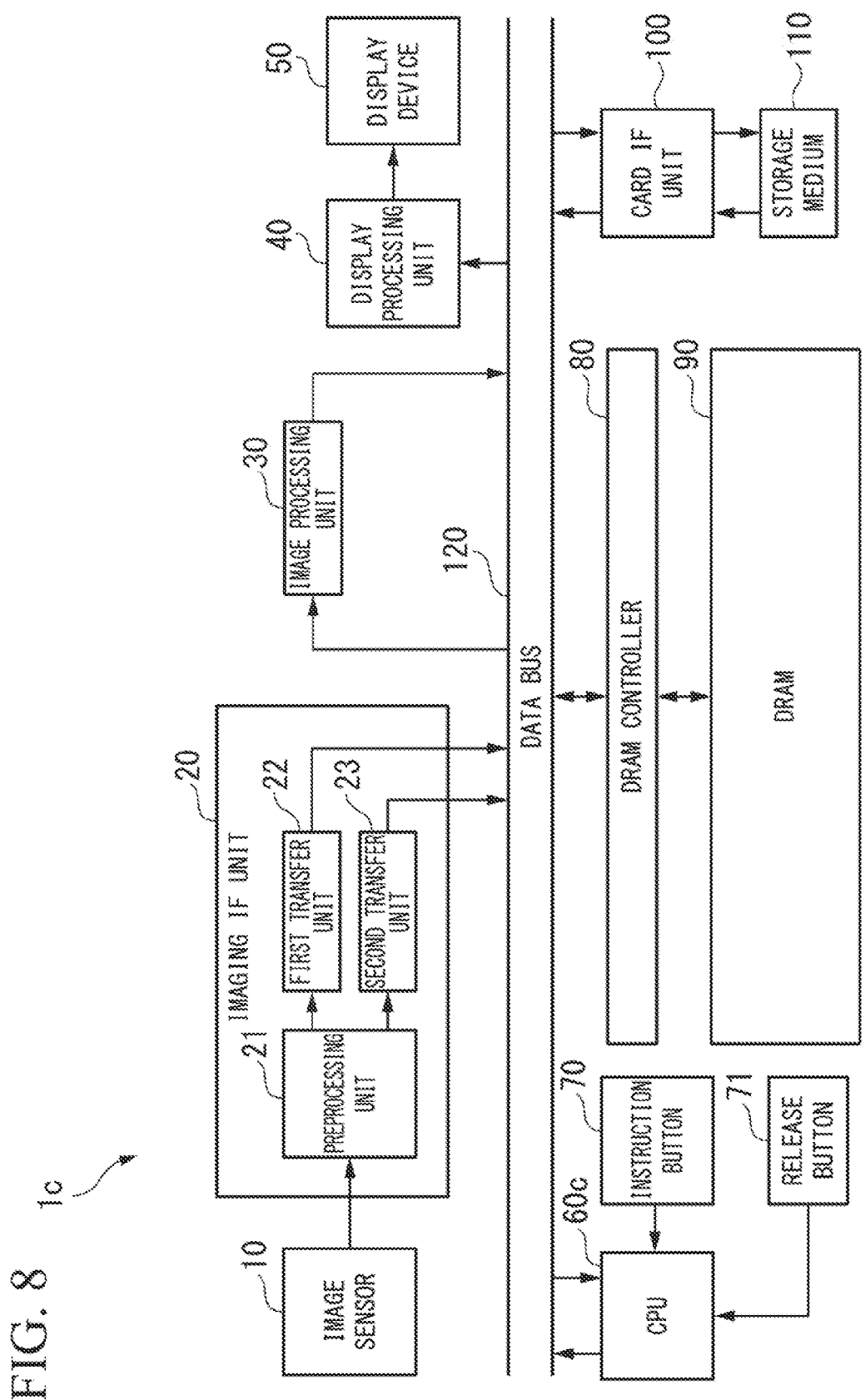
FIG. 8 is a schematic block diagram illustrating a configuration of an imaging device of a third embodiment.

FIG. 8 is a schematic block diagram illustrating a configuration of the imaging device 1c in the third embodiment. Components common to FIG. 1 are denoted by the same reference numerals and a concrete description thereof is omitted. In a configuration of the imaging device 1c of FIG. 8, the CPU 60 in the configuration of the imaging device 1 of FIG. 1 is changed to a CPU 60c and a release button (a second input unit) 71 is added.

The CPU 60c performs a process similar to that of the CPU 60 in the first embodiment, but differs in the following matters. First, a user is assumed to usually capture a still image in a "loss prevention mode" of the imaging device 1c. At that time, for example, if the user presses the release button 71, the CPU 60c causes an image sensor 10 to capture a still image at that timing and causes the captured still image to be stored in a storage medium 110. Further, concurrently, the imaging device 1c executes an accumulation process for a moving image and still images (raw images) performed in the first embodiment, as backup in a background.

Accordingly, a user may perform the following operation. When the user is able to capture a desired still image, the imaging device 1c deletes data of a moving image and still images (raw images) captured in the backup in a batch in response to an instruction of the user. On the other hand, when the user is not able to capture the desired still image, the user selects, for example, an image of a desired frame from the moving image as in the first embodiment using the data of the moving image and the still images (raw images) captured in the backup. In this case, the imaging device 1 identifies, for example, the still image (raw image) corresponding to the image of the frame selected by the user, converts the identified still image (raw image) to a JPEG image, and stores the JPEG image after the conversion.

Thus, the release button functions as the second input unit that receives a still image photography instruction from a photographer. When the release button receives the photography instruction, the image sensor 10 images a subject. Also, the CPU 60c functions as a storage processing unit that causes still image data obtained through imaging by the image sensor 10 to be stored in the storage medium 110.

Accordingly, this embodiment gains advantage, which the first embodiment does, even when the user is not able to capture a desired still image, the user can record an image of a desired frame with high image quality from the moving image later. This may lead an improvement in the usability.

Further, a second transfer unit 23 may perform a resizing process (e.g., a reducing process) on the data after preprocessing input from a preprocessing unit 21. In this case, since the number of pixels of the raw image for a still image decreases, a load related to processing of the still image can be reduced. This is particularly effective when the user desires to back up the image and allows reduction in the number of pixels.

Further, the imaging device 1, 1b or 1c of each embodiment is particularly effective when image processing in the image processing unit 30 is time-consuming processing. This will be described hereinafter using a noise reduction process in high sensitivity (hereinafter referred to as a high-sensitivity NR process) as an example of the time-consuming image processing. When the image processing unit 30 performs a process of executing image processing several times in order to secure a filter tap number, more time is taken than in normal image processing. In this case, the imaging device 1 can usually capture, for example, 10 frames per second in the NR process, but may capture only 5 frames per second in the high-sensitivity NR process. Thus, with a conventional scheme, probability of missing an opportunity for a photograph increases in the high-sensitivity NR process.

On the other hand, in each embodiment, the imaging device 1, 1b or 1c performs the accumulation process for the moving image and the still images (raw images) at the time of photography. In this case, since the image processing unit 30 of the imaging device 1 does not perform the high-sensitivity NR process, a continuous shooting interval of the imaging device 1, 1b or 1c is not degraded.

Then, the imaging device 1, 1b or 1c performs the high-sensitivity NR process on only the image selected from the accumulated moving image and records the image after the high-sensitivity NR process at the time of playback. Thus, the high-sensitivity NR process is performed on only a finally recorded image, thus improving image quality of an image at a timing desired by the user, which is the finally recorded image, without degradation of the continuous shooting interval at the time of the photography even when the image processing takes time.

Further, the time-consuming image processing, is not limited to the high-sensitivity NR process, and includes a distortion correction process, an art filtering process, super-resolution processing, a tilt correction process, a trapezoidal distortion correction process, a pixel defect correction process, a process using a DSP (Digital Signal Processor), or the like. Here, the distortion correction process is, for example, a process performed when an amount of distortion of an image is large. Further, the art filtering process is a process of creating an artistic image different from an original image to be viewed by the naked eye through a filtering process. Further, the process using a DSP takes a time since dedicated hardware is not used.

Further, the imaging device 1, 1b or 1c in each embodiment is capable of digital zoom when a zoom instruction is given at the time of playback. Further, in order to give the zoom instruction, the user may press a zoom button of a camera or may expand and contract a distance between a lens and an imaging element when the imaging device 1, 1b or 1c is a single-lens reflex imaging device. Further, the imaging device 1, 1b or 1c may cut a part of a selected still image or may enlarge and record all or a part of the image.

Further, the imaging device 1, 1b or 1c in each embodiment may perform photography with special processing (e.g., an art filtering process or an exposure control process). For example, when the user performs designation to validate a special processing function, the imaging device may perform the special processing on still images to be recorded at the time of playback. It is difficult to perform optimal processing at the time of actual photography; but in the case of playback, the still image to be recorded may be modified as many times as necessary by changing parameters such as processing intensity. This is effective particularly in a case in which such special processing is performed on a fast moving subject. Further, there is an advantage in that image quality of images to be generated is not reduced even when such special processing is performed on the raw image since the imaging device 1, 1b or 1c, for example, accumulates the raw images.

Further, a program for executing each process of the imaging device 1, 1b or 1c of each embodiment may be recorded in a computer-readable storage medium, and the program recorded in the storage medium may be loaded and executed on a computer system to perform various processes described above according to the imaging device 1, 1b or 1c.

Further, the "computer system" cited herein may include an OS or hardware such as peripheral devices. Further, a "computer system" cited herein also includes a homepage providing environment (or display environment) if a WWW system is being used. Further, the "computer-readable recording medium" includes a portable medium such as a flexible disk, a magnetic optical disc, a ROM, a writable nonvolatile memory such as a flash memory, or a CD-ROM, or a storage device such as a hard disk embedded in the computer system.

Further, the "computer-readable recording medium" also includes a recording medium that holds a program for a predetermined time, such as a volatile memory (e.g., a DRAM (Dynamic Random Access Memory)) inside a computer system including a server and a client when a program is transmitted via a network such as the Internet or a communication line such as a telephone line. Further, the above-described program may be transmitted from a computer in which the program is stored in a storage device or the like to other computers via a transmission medium or by transmission waves in the transmission medium. Here, the "transmission medium" transmitting the program refers to a medium having a function of transmitting information, such as a network (communication network) such as the Internet or a communication, line such as a telephone line. Also, the above-described program may be a program for realizing some of the above-described functions. Alternatively, the program may be a program capable of realizing the above-described functions in combination with a program previously stored in a computer system, i.e., a differential file (a differential program).

As described above, according to the embodiments of the present invention, it is possible to acquire an image with high resolution at a timing desired by a user while securing operability.

While the preferred embodiments of the present invention have been described, the present, invention is not limited to these embodiments. Additions, omissions, substitutions, and other modifications of a configuration can be made without departing from the spirit or scope of the present invention. Accordingly, the invention is not to be considered as being limited by the foregoing description, and is only limited by the scope of the appended claims.

What is claimed is:

1. An imaging device comprising:
   an imaging unit that images a subject;
   a transfer processing unit that reduces the size of images of a plurality of frames obtained through imaging by the imaging unit, and transfers second image data of frames associated with each of the reduced images of the plurality of frames, which are images obtained through imaging by the imaging unit;
   a storage processing unit that causes first image data of a plurality of frames obtained through reduction by the transfer processing unit to be stored in a storage medium and causes the second image data transferred by the transfer processing unit to be stored in the storage medium;
   a processing unit that causes the reduced images of the plurality of frames to be displayed on a display unit with reference to the first image data stored by the storage processing unit; and
   an input unit that receives an instruction during display of an image of any one frame from among the reduced images being displayed on the display unit,
   wherein the processing unit identifies the second image data corresponding to the image of the reduced frame being displayed at the time the instruction is received.

2. The imaging device according to claim 1, comprising:
   an image processing unit that performs image processing on the second image data identified by the processing unit,
   wherein the storage processing unit stores the identified second image data in the storage medium,
   wherein the first image data and the second identified image data are processed by the image processing unit.

3. The imaging device according to claim 2, comprising:
   an input unit that receives a deletion instruction,
   wherein, when the input unit receives the deletion instruction, the storage processing unit deletes at least one of the first image data of a plurality of frames and the second image data of a plurality of frames from the storage medium in which the respective image data has been stored.

4. The imaging device according to claim 1, wherein the processing unit performs slow playback or frame-by-frame playback on the reduced images when the reduced images are played back.

5. The imaging device according to claim 1, comprising:
   a second input unit that receives a still image photography instruction from a photographer,
   wherein the imaging unit images the subject when the second input unit receives the photography instruction, and
   the storage processing unit causes still image data obtained through imaging by the imaging unit to be stored in the storage medium.

6. The imaging device according to claim 5, wherein the still image data is raw image data.

7. The imaging device according to claim 1, wherein the transfer processing unit includes:
   a first transfer unit that reduces the size of the images of a plurality of frames obtained through imaging by the imaging unit; and
   a second transfer unit that transfers the second image data of a plurality of frames associated with each of the reduced images of a plurality of frames, which are images obtained through imaging by the imagine unit.

8. The imaging device according to claim 1, wherein the transfer processing unit reduces the size of an image of one of an odd frame and an even frame obtained through imaging by the imaging unit, and transfers an image of the other of the odd frame and the even frame obtained through imaging by the imaging unit.

9. A method of capturing an image, the method comprising:
   a transfer processing step of reducing the size of images of a plurality of frames obtained through imaging, and transferring second image data of frames associated with each of the reduced images of the plurality of frames;
   a storage processing step of causing first image data of a plurality of frames obtained through the reduction in the transfer processing step to be stored and causing the second image data of a plurality of frames transferred in the transfer processing step to be stored;
   a processing step of causing the reduced images of the plurality of frames to be displayed with reference to the first image data stored in the storage processing step;
   an input step of receiving an instruction during display of an image of any one frame from among the reduced displayed images; and
   an identifying step of identifying the second image data corresponding to the image of the reduced frame being displayed at the time the instruction is received.

10. A program product for capturing an image, the program product comprising a non-transitory computer readable medium including a program enabling a computing device to perform a method comprising:
    a transfer processing step of reducing the size of images of a plurality of frames obtained through imaging and transferring second image data of frames associated with each of the reduced images of the plurality of frames;
    a storage processing step of causing first image data of a plurality of frames obtained through the reduction in the transfer processing step to be stored and causing the second image data of a plurality of frames transferred in the transfer processing step to be stored;
a processing step of causing the reduced images of the plurality of frames to be displayed with reference to the first image data stored in the storage processing step;
an input step of receiving an instruction during display of an image of any one frame from among the reduced displayed images; and
an identifying step of identifying the second image data corresponding to the image of the reduced frame being displayed at the time the instruction is received.

* * * * *